No. 861,844. PATENTED JULY 30, 1907.
J. F. HEMMINGS.
NUT LOCK AND LOCK NUT.
APPLICATION FILED JAN. 2, 1907.

Witnesses:

James F. Hemmings
Inventor
by James L. Norris
atty

UNITED STATES PATENT OFFICE.

JAMES FREDERICK HEMMINGS, OF ST. LEONARDS-ON-SEA, ENGLAND.

NUT-LOCK AND LOCK-NUT.

No. 861,844.

Specification of Letters Patent.

Patented July 30, 1907.

Application filed January 2, 1907. Serial No. 350,449.

*To all whom it may concern:*

Be it known that I, JAMES FREDERICK HEMMINGS, a subject of the King of Great Britain, residing at No. 54 Sedlescombe road north, St. Leonards-on-Sea, England, have invented new and useful Improvements in Nut-Locks and Lock-Nuts, of which the following is a specification.

One form of appliance embodying this invention and serviceable either as a nut-lock or as a lock nut consists of a permanently flat ring of sheet steel from the inner marginal part of which ring is formed a tooth having a sharp angular free end projecting beyond the main portion of one surface of the said ring the relation of the inner diameter of which to the screw it is designed for application to is such that when the said ring is applied to the said screw the free end of the said tooth is necessarily between two convolutions of the thread of the said screw. In using the said appliance it is engaged with the thread of the screw to which it is to be applied the side from which the tooth projects being outward and it is then turned on the said screw until it is in contact with the bearing surface after which it is further turned until quite tight the sharp angular free end of the said tooth then biting the inner face of the thread with which it is in contact and thus in the manner of a ratchet tooth very forcibly opposing turning of the appliance in the unscrewing direction. Where deemed desirable two or more of the said appliances face to face may be applied to a screw either for the purpose of securing a nut thereon or for the purpose of a lock nut.

In an alternative form of the aforesaid appliance the aforesaid ring has two or more of the said teeth. In such cases the relative extent of projection of the several teeth is such that when both or all are in engagement with the thread of a screw the main portion of the said ring is in a plane at right angles to the axis of the said screw. Another alternative form of the said appliance consists of two or more of the aforesaid toothed rings secured together face to face by any suitable means. According to one convenient means for securing the rings together one of them has an upturned rim formed on it within which the other or others is or are placed and confined by bending inward the edge of the said rim. The configuration of the external periphery of the aforesaid appliance may be either circular or polygonal.

The several forms of the appliance hereinbefore described are illustrated in the accompanying drawing the views shown in the several figures of which are as follows:—

Figure 1:
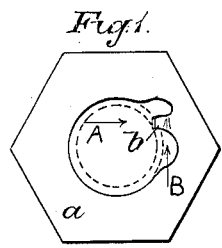
Figure 3:
Figure 4:
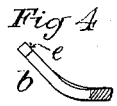
Figure 5:
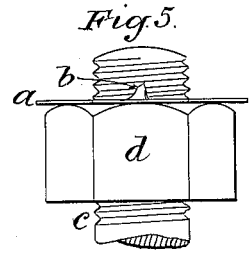
Figure 2:
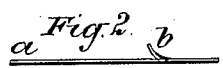
Figure 8:
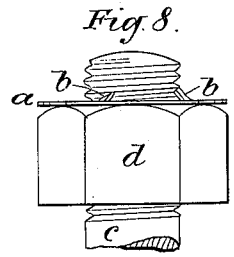
Figure 6:
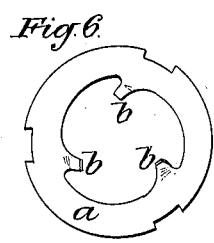
Figure 9:
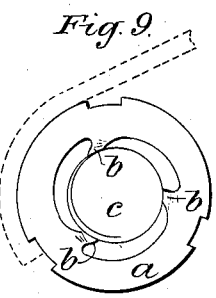
Figure 14:
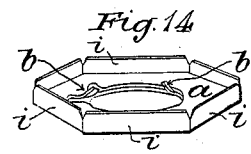

Figure 1 is a face view and Fig. 2 an edge view of the form consisting of a flat ring having one tooth projecting from its inner marginal part and having a polygonal outer periphery to admit of turning of the said appliance on a screw by means of an ordinary spanner. Fig. 3 is an enlarged view of the toothed portion of the said appliance looking in the direction of the arrow A Fig. 1 and Fig. 4 is a view of the same portion looking in the direction of the arrow B. Fig. 5 illustrates the appliance in use as a nut lock. Fig. 6 is a face view and Fig. 7 an edge view of a form of the said appliance in which three teeth project from the inner marginal part and the outer periphery is circular and notched to admit of the appliance being turned by aid of a suitably formed instrument. Fig. 8 is a side view and Fig. 9 an end view of a screw with nut secured by means of the same appliance. Figs. 10 and 11 and Figs. 12 and 13 illustrate in side and edge view respectively two other forms of the said appliance differing slightly from that illustrated in Figs. 6 and 7 in regard to shape of the teeth and having other provisions to admit of tightening up the appliance on a screw. Fig. 14 is a perspective view illustrative of the means hereinbefore described for securing a number of the toothed rings.

In the following description of the said figures the parts thereof are referred to by the letters marked thereon. In all the said figures the aforesaid permanently flat steel ring is marked $a$ and the teeth projecting from its inner marginal part are marked $b$. In those of the figures illustrating the appliances in connection with screws and nuts the screws are marked $c$ and the nuts $d$.

Figure 7:

The shape of the free ends of the teeth of the appliances illustrated in Figs. 1 and 2 and in Figs. 6 and 7 is most plainly illustrated in Figs. 3 and 4 on examination of which it will be seen that the only part of the tooth which is capable of contact with the thread of the screw when the appliance is in use is the angular edge $e$ at the junction of its outer face with its end face and that the line of the said edge or acting part of the tooth is at an angle relatively to the plane of the ring $a$. The particular angle required for this part is dependent on the shape of thread of the screw which the appliance is designed for use with and it is preferable that the said angle be such that the whole length of the said acting edge of the tooth will bear on the thread of the screw.

Where as illustrated in Figs. 1 and 2 the appliance has but one tooth the size of the opening of the ring $a$ and the extent of inward projection of the tooth $b$ should be such that when the appliance is engaged with the screw it is designed for use with the position of the nose and bottom of the thread relatively to the said parts will be as indicated by the concentric broken lines in Fig. 1.

In the case of the form of appliance illustrated in Figs. 6 and 7 and other forms having three or more teeth the openings should be of such size that the inner ends of the acting edges of the teeth may be nearly in contact with the bottom of the thread of the screw they are designed for use with and the relative extent of projection of the said teeth beyond the plane of the ring *a* is such that all may fairly engage with the screw thread or take a hold thereon.

Figures 10, 12:
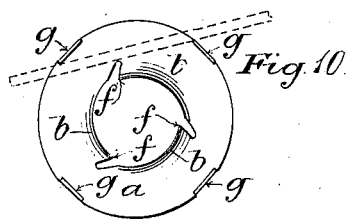
Figures 11, 13:
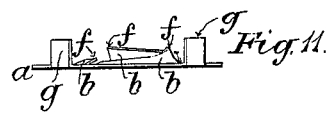

In the form of the appliance illustrated in Figs. 10 and 11 and in the one illustrated in Figs. 12 and 13 the teeth *a a* are so shaped that only the pointed extremities *f f* thereof are in contact with the screw thread when the said appliances are in use. The upturned parts *g g* in Figs. 10 and 11 and *h h* in Figs. 12 and 13 admit of the said appliances being turned on a screw without the aid of a special tool the required turning of the said appliances when in contact with a bearing surface being readily effected by means of a simple bar engaged with the said upturned parts as indicated in broken lines in Figs. 10 and 12 and used as a lever.

Any of the forms of the appliance embodying this invention may be furnished with any of the provisions hereinbefore described for turning them or with any other convenient provision for that purpose.

In the form of the appliance illustrated in Fig. 14 one of the toothed rings has at its outer periphery extensions *i i* which are bent at right angles to the said ring forming an open mouthed box capable of receiving a number of the aforesaid toothed rings which when placed in the said box with their teeth in suitable relative positions for proper engagement of all with the thread of the screw the appliance is designed for application to are secured in position by bending the edges of the said extensions *i i* over and pressing them into close contact with the outermost ring.

A suitable mode of production of the appliances embodying this invention is by stamping between dies in a press. The said appliances should be hardened and tempered in order that the teeth may not take a permanent set under pressure and it is of importance that the stamping be so effected that the acting ends or extremities of the teeth will be left sharp in order to insure a proper bite thereof on the screw thread. In the case of these forms of the said appliance which have more than one tooth it is also of importance that the extent of projection of the several teeth of the appliance be such that when it is engaged with a screw and turned so as to bring the appliance fairly but lightly to its bearing the acting ends of all the teeth will be in contact with the inner face of the screw thread.

I claim:—

1. An appliance for the purposes set forth consisting essentially of a permanently flat steel ring having an internal diameter sufficient to clear the screw thread of a bolt and having an angularly ended tooth permanently projecting from its inner marginal part beyond the plane of one of its faces and spirally towards its center in the unscrewing direction the acting part of which tooth is adapted to pass between the convolutions of the said screw thread and at its angular extremity to bite against and tend to penetrate the inner face of such thread when the appliance is screwed up to the bearing surface.

2. An appliance for the purposes set forth consisting essentially of a permanently flat steel ring having an internal diameter sufficient to clear the screw thread of a bolt and having angularly ended teeth permanently projecting from its inner marginal part beyond the plane of one of its faces and spirally towards its center in the unscrewing direction the acting part of each of which teeth is adapted to pass between the convolutions of the said screw thread and at its angular extremity to bite against and tend to penetrate the inner face of such thread when the appliance is screwed up to its bearing surface.

JAMES FREDERICK HEMMINGS.

Witnesses:
PERCY CHARLES RUSHEN,
PERCY CHARLES GIDDINGS.